(12) United States Patent
Togashi et al.

(10) Patent No.: US 6,906,995 B2
(45) Date of Patent: Jun. 14, 2005

(54) INFORMATION READ/WRITE MEDIUM

(75) Inventors: Takahiro Togashi, Saitama-ken (JP); Masataka Yamaguchi, Saitama-ken (JP); Yoichi Okumura, Saitama (JP)

(73) Assignee: Pioneer Corporation, Tokyo (JP)

( * ) Notice: Subject to any disclaimer, the term of this patent is extended or adjusted under 35 U.S.C. 154(b) by 170 days.

(21) Appl. No.: 10/600,768

(22) Filed: Jun. 23, 2003

(65) Prior Publication Data

US 2004/0001424 A1 Jan. 1, 2004

(30) Foreign Application Priority Data

Jun. 28, 2002 (JP) ....................... 2002-188831

(51) Int. Cl.[7] .............................................. G11B 3/70
(52) U.S. Cl. ...................................................... 369/283
(58) Field of Search ................................ 369/281, 283, 369/284, 286; 430/270.13

(56) References Cited

U.S. PATENT DOCUMENTS 6,232,035 B1 * 5/2001 Hirotsune et al. ..... 430/270.13
6,511,788 B1 * 1/2003 Yasuda et al. ......... 430/270.13
2003/0147341 A1 * 8/2003 Fargeix et al. ............... 369/284

FOREIGN PATENT DOCUMENTS

WO         WO 02017304 A2 *   2/2002

* cited by examiner

Primary Examiner—Tianjie Chen
(74) Attorney, Agent, or Firm—Arent Fox

(57) ABSTRACT

A stack "0" having a recording layer serving to transmit a light beam includes a heat dissipating layer, a reflective layer, an enhanced layer, and the recording layer, which are formed in that order on an intermediate layer. The reflective layer is translucent to a light beam, while the heat dissipating layer has a thermal conductivity higher than that of the intermediate layer as well as a refractive index higher than or equal to that of the intermediate layer and less than or equal to a refractive index 3. The thickness of the heat dissipating layer is set to a value within the range of a predetermined condition defined in accordance with a refractive index, the wavelength of the light beam, and a given integer. Thus, an information read/write medium configured to enable information to be recorded/reproduced thereon/therefrom as well as to effectively cool a recording layer serving to transmit a light beam is provided.

7 Claims, 8 Drawing Sheets

FIG.2

| | MATERIAL | REFRACTIVE INDEX |
|---|---|---|
| COVER LAYER: 23 | POLYCARBONATE | 1.6125 |
| PROTECTIVE LAYER: 22 | ZnS−SiO$_2$ | 2.31 |
| RECORDING LAYER: 21 | Ge−In−Sb−Te | 1.4+3.2i (CRYSTALLINE PHASE) |
| | | 2.6+2.9i (AMORPHOUS PHASE) |
| ENHANCE LAYER: 20 | ZnS−SiO$_2$ | 1.6125 |
| REFLECTIVE LAYER: 19 | Ag(BULK) | 0.20+2.0i |
| | Ag(THIN FILM) | 0.83+2.4i |
| | AgTi ALLOY(THIN FILM) | 0.51+2.2i |
| HEAT DISSIPATING LAYER: 18 | ZnS−SiO$_2$ | n |
| INTERMEDIATE LAYER: 17 | POLYCARBONATE | 1.6125 |

INFORMATION READ/WRITE MEDIUM

BACKGROUND OF THE INVENTION

The present invention relates to an information read/write medium on which information can be recorded and from which information can be reproduced, and more particularly to the structure of the information read/write medium.

The present application claims priority from Japanese Patent Application No. 2002-188831, the disclosure of which is incorporated herein by reference.

In recent years, there is an increasing demand for a larger-storage-capacity information read/write medium (hereinafter referred to as an "optical disc") which utilizes beams of light to record information thereon or reproduce information therefrom.

To meet this demand, research and development has been conducted on a phase change optical disc having two recording layers or a so-called two-layer recording phase-change optical disc, implementing a recording capacity being about twice as large as that of a phase change optical disc having only one recording layer.

FIG. 8 is a schematic sectional view illustrating a typical structure of this phase change optical disc, provided with a stack of layers "0" having a first recording layer 9 and a stack of layers "1" having a second recording layer 4.

The recording layers 4 and 9 are formed of a compound which is heated by a laser light beam or cooled to change its phase to either the crystalline phase or an amorphous phase, the phase change enabling information to be rewritten as many times as desired.

In this arrangement, the stack "1" is formed of a reflective layer 2, an enhanced layer 3, the aforementioned recording layer 4, and a protective layer 5, which are deposited sequentially in that order on a substrate 1.

On the other hand, the stack "0" is formed of a reflective layer 7, an enhanced layer 8, the aforementioned recording layer 9, and a protective layer 10, which are deposited sequentially in that order via an intermediate layer 6 overlying the protective layer 5.

The internal structure of the phase change optical disc is entirely covered and protected with the substrate 1 and a cover layer 11 deposited on the protective layer 10.

In the phase change optical disc constructed as described above, a laser beam enters the cover layer 11 at a predetermined power, thereby allowing information to be recorded on the disc or reproduced from the disc.

That is, to record information, a focused recording laser beam is incident upon the recording layer 9 in the stack "0," thereby allowing information to be recorded onto the recording layer 9.

On the other hand, a focused recording laser beam directed to the recording layer 4 in the stack "1" passes through the stack "0" to impinge on the recording layer 4, thereby allowing information to be recorded onto the recording layer 4 by so-called direct overwriting.

In contrast to this, to reproduce information, a focused reproducing laser beam directed to the recording layer 9 in the stack "0" is reflected off the recording layer 9 or the like, and the stored information contained in the reflected beam is then subjected to signal processing or the like in a reproducing apparatus, thereby allowing information to be reproduced.

On the other hand, a focused reproducing laser beam directed to the second recording layer 4 in the stack "1" and having passed through the stack "0" is reflected off the recording layer 4 or the like, and the stored information contained in the reflected beam is then subjected to signal processing or the like in the reproducing apparatus, thereby allowing information to be reproduced.

As described above, attention has been focused on the storage medium of this type or the two-layer recording phase-change optical disc which comprises two recording layers for recording and reproducing information to provide an increased storage capacity, thereby enabling large volumes of data such as a long duration movie or high resolution image to be recorded or reproduced.

However, as can be seen from the structural property shown in FIG. 8, the aforementioned two-layer recording phase-change optical disc provides a small cooling effect to the recording layer 9 in the stack "0."

For this reason, with this disc, there was a problem that a reproducing laser beam incident upon the recording layer 9 in the stack "0" caused the information already stored thereon to easily deteriorate since it was difficult for the heat produced by the absorbed laser beam to escape therefrom.

There was also another problem that due to the bad cooling effect upon direct overwriting on the recording layer 9, only a low recording bias power was allowed, thereby causing the information previously recorded thereon to be erased insufficiently.

Furthermore, the stack "1" is provided in close proximity to the substrate 1 and serves no function for transmitting laser beams. For example, this may allow a sufficiently thick metal layer having a good thermal conductivity to be formed between the stack "1" and the substrate 1 to provide an increased cooling effect to the recording layer 4, however, it is extremely difficult to form a similar metal layer having a sufficient thickness to allow the stack "0" to provide an increased cooling effect to the recording layer 4.

That is, suppose that the same thick metal layer as the one provided for the stack "1" is simply provided for the stack "0." In this case, the incident laser beam would be blocked by the metal layer, thereby causing information to be recorded or reproduced with difficulty on or from the recording layer 4 in the stack "1."

For this reason, the technique, which employs the aforementioned metal layer in an optical disc having only the stack "1" or the so-called one-layer recording phase-change optical disc to provide an increased cooling effect to the recording layer, can be used as it is with difficulty to cool the recording layer 9 in the stack "0" formed in the two-layer recording phase-change optical disc. Accordingly, it has been extremely critical to develop a novel technique which can overcome this difficulty.

SUMMARY OF THE INVENTION

The present invention was developed in view of the conventional problems described above. It is therefore an object of the invention to provide an information read/write medium having a structure which enables recording and reproducing information as well as providing effective cooling to a recording layer responsible for transmitting light.

According to one aspect of the present invention, an information read/write medium has a plurality of recording layers which enable information to be recorded thereon and reproduced therefrom using a light beam. The medium includes a reflective layer, a heat dissipating layer, and an intermediate layer, the layers being deposited for each of the recording layers for serving to transmit the light beam to allow information to be recorded on and reproduced from another recording layer. The medium is characterized in that the reflective layer is translucent to the light beam; that the heat dissipating layer has a thermal conductivity higher than that of the intermediate layer as well as a refractive index higher than or equal to that of the intermediate layer and less than or equal to a refractive index of 3; and that the heat dissipating layer has a thickness d which satisfies the relation given by the following expression, $$\{(2\lambda/50n)+(N\times\lambda/2n)\}<d<\{(15\lambda/50n)+(N\times\lambda/2n)\}$$

where n is the refractive index of the heat dissipating layer, λ is a wavelength of the light beam, and N is a given integer.

The information read/write medium configured as such efficiently dissipates the heat generated upon information recording, and ensures an appropriate recording property as well as an optical transmittance which allows a sufficient amount of light to be transmitted to record and reproduce information on another recording layer.

Furthermore, the heat dissipating layer is formed in a thickness d which satisfies the aforementioned condition. This allows the light beam to pass through the reflective layer with an increased optical transmittance and the transmitted light beam to be used to properly record information on and reproduce information from another recording layer.

BRIEF DESCRIPTION OF THE DRAWINGS

These and other objects and advantages of the present invention will become clear from the following description with reference to the accompanying drawings, wherein:

FIG. 2 is a table showing the material and the refractive index of the information read/write medium according to the embodiment;

DETAILED DESCRIPTION OF THE PREFERRED EMBODIMENTS

Now, an information read/write medium according to an embodiment will be described below with reference to FIGS. 1 to 7. The description will be given to a phase change optical disc as the information read/write medium according to the embodiment.

Figure 1:
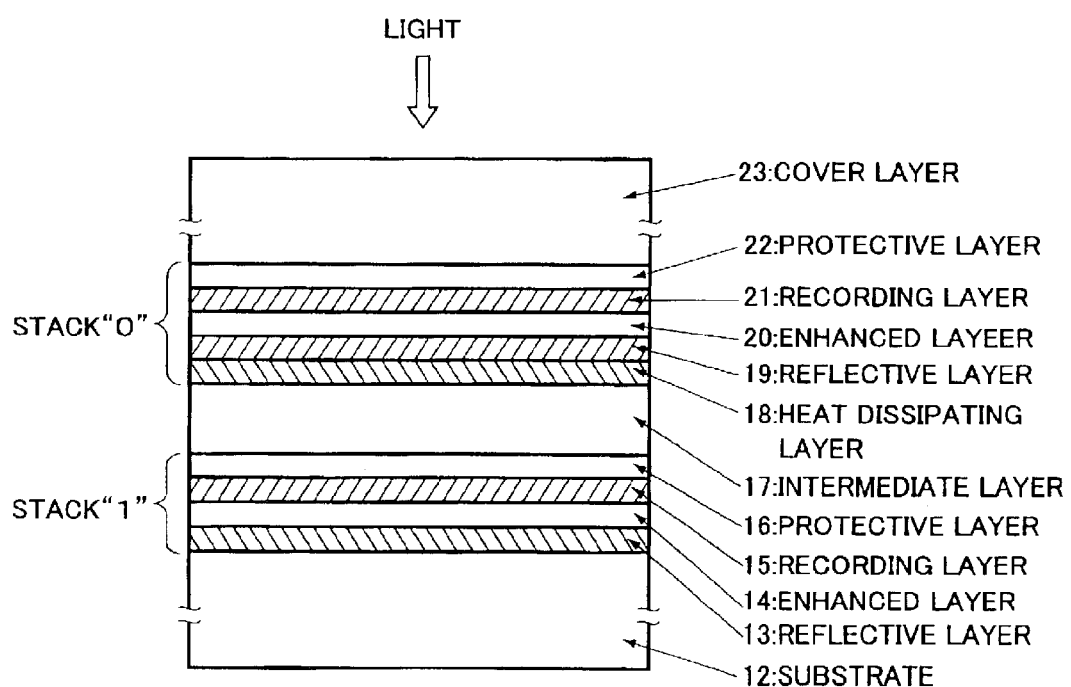
FIG. 1 is a schematic longitudinal sectional view illustrating the structure of an information read/write medium according to one embodiment of the present invention.

FIG. 1 is a longitudinal sectional view of the structure of the phase change optical disc according to the embodiment, illustrating the structure partially exploded in the direction of its thickness.

FIG. 2 is a table showing specific materials and refractive indices of each of the stack of layers carried by the phase change optical disc.

Referring to FIGS. 1 and 2, the phase change optical disc is provided with a stack of layers "0" having a first recording layer 21 and a stack of layers "1" having a second recording layer 15.

That is, the stack "1" is formed of a reflective layer 13, an enhanced layer 14, the aforementioned recording layer 15, and a protective layer 16, which are deposited sequentially in that order on a substrate 12.

On the other hand, the stack "0" is formed of a heat dissipating layer 18, a reflective layer 19, an enhanced layer 20, the aforementioned recording layer 21, and a protective layer 22, which are deposited sequentially in that order via an intermediate layer 17 overlying the protective layer 16.

The internal structure of the phase change optical disc is entirely covered and protected with the substrate 12 and a cover layer 23 deposited on the protective layer 22.

The substrate 12 is formed of a hard resin material such as polycarbonate, while the intermediate layer 17 and the, cover layer 23 are made of a resin material transparent to a laser beam of a predetermined wavelength λ, such as polycarbonate.

The recording layers 15 and 21 are made of a Sb—Te eutectic material (e.g., a Ge—In—Sb—Te compound) which is heated by the aforementioned laser beam or cooled to change to either the crystalline phase or an amorphous phase. As illustrated in FIG. 2, a change in refractive index takes place between the crystalline state and an amorphous state, the phase change enabling information to be rewritten as many times as desired.

The reflective layers 13 and 19 are formed of a thin film or bulk of pure silver (Ag) or a AgTi alloy thin film.

Although detailed later, the reflective layer 19 is made very thin so as to be translucent to the aforementioned laser beam or to have a transmittance of about 50%, more specifically, within a range of about 5 to 20 nm in film or layer thickness.

The enhanced layers 14 and 20 and the protective layers 16 and 22 are made of a dielectric thin film, such as ZnS—SiO$_2$, which is transparent to the aforementioned laser beam.

The heat dissipating layer 18 is made of a dielectric thin film, such as ZnS—SiO$_2$, which is higher in thermal conductivity than the intermediate layer 17 and transparent to the aforementioned laser beam, having a refractive index n greater than or equal to the refractive index n$_{17}$ of the intermediate layer 17 and less than or equal to 3. Furthermore, the thickness d of the heat dissipating layer 18 is set at the value which satisfies the condition expressed by the following expression (1):

$$\{(2\lambda/50n)+(N\times\lambda/2n)\}<d<\{(15\lambda/50n)+(N\times\lambda/2n)\} \qquad (1)$$

where coefficient N is a positive integer.

More specifically, in a case where the wavelength λ of the laser beam is an N integral multiple of 405 nm and the refractive index n of the heat dissipating layer 18 is 2.31, the thickness d of the heat dissipating layer 18 lies within the range from about 100 to 150 nm.

The phase change optical disc constructed as described above allows a laser beam to enter the cover layer 23 at a predetermined power, thereby recording information on the disc or reproducing information therefrom.

That is, to record information, a focused recording laser beam is incident upon the recording layer 21 in the stack "0," thereby allowing information to be recorded onto the recording layer 21.

Furthermore, to record information, a focused recording laser beam directed to the recording layer 15 in the stack "1" passes through the stack "0" to impinge on the recording layer 15, thereby allowing information to be recorded onto the recording layer 15 or carrying out so-called direct overwriting.

Upon direct overwriting onto the stack "0," the heat dissipating layer 18 absorbs the heat produced by the recording laser beam via the enhanced layer 20 and the reflective layer 19, thereby providing a support for a good recording operation on the recording layer 21.

Although detailed later, since the refractive index n and the thickness d of the heat dissipating layer 18 are defined so as to satisfy the condition given by the aforementioned expression (1), the transmittance of the stack "0" will not decrease. This allows the recording laser beam to remain unchanged at an appropriate power and be transmitted to the recording layer 15, thereby making it possible to properly record information thereon.

In contrast to this, to reproduce information, a focused reproducing laser beam directed to the recording layer 21 in the stack "0" is reflected off the recording layer 21, and the recorded information contained in the reflected beam is then subjected to signal processing or the like in a reproducing apparatus, thereby allowing information to be reproduced.

On the other hand, a focused reproducing laser beam directed to the recording layer 15 in the stack "1" and having passed through the stack "0" is reflected off the recording layer 15, and the stored information contained in the reflected beam is then subjected to signal processing or the like in the reproducing apparatus, thereby allowing information to be reproduced.

Now, the effects provided by the phase change optical disc are described with reference to FIGS. 3 and 5.

That is, the description is given to the effects which are obtained by providing the heat dissipating layer 18 having a refractive index n greater than or equal to the refractive index $n_{17}$ of the intermediate layer 17 and less than or equal to 3 as well as by setting the thickness d thereof in accordance with the condition given by the aforementioned expression (1).

Figure 3:
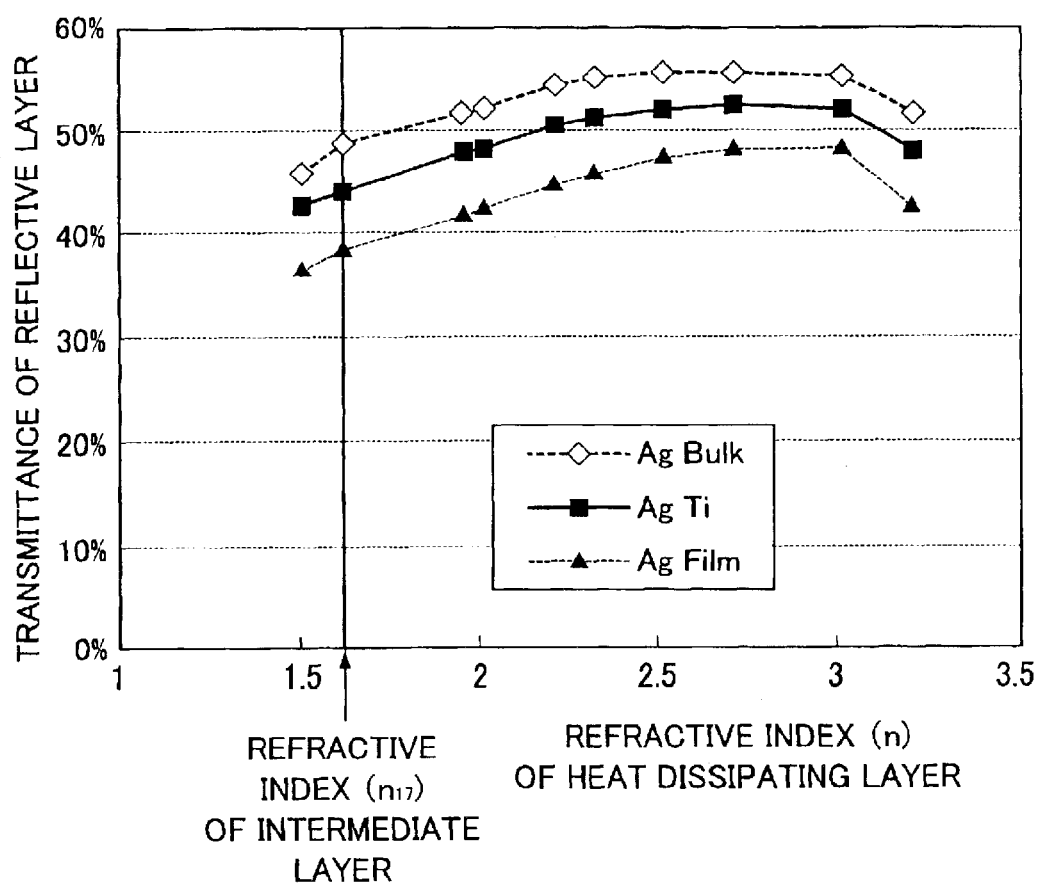
FIG. 3 is a graph showing the relationship between the refractive index of a heat dissipating layer and the transmittance of a reflective layer.

FIG. 3 is a graph showing the relationship between the refractive index n of the heat dissipating layer 18 and the transmittance of the reflective layer 19. The graph also shows a case where the recording layer 21 has a reflectivity of 10% in the crystalline state and a reflectivity of 3% in an amorphous state, with the reflective layer 19 having a transmittance of about 50%.

Figure 4:
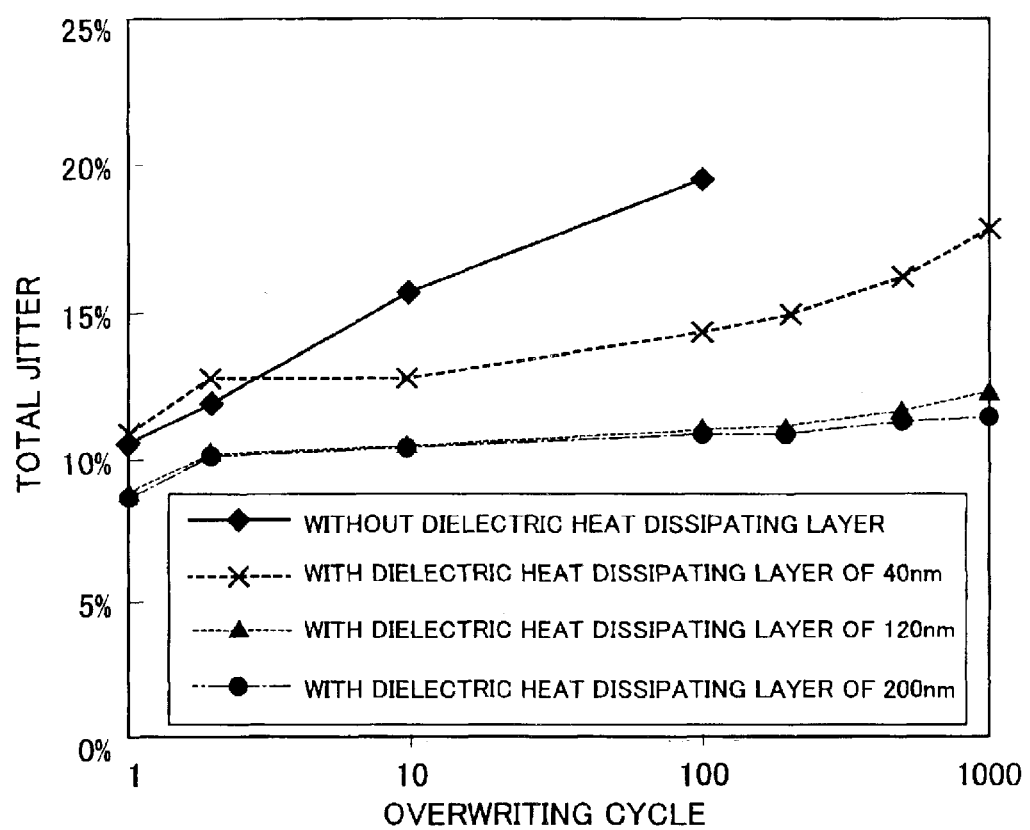
FIG. 4 is a graph showing the relationship between the number of times of direct overwriting operations on the recording layers and the jitter.

FIG. 4 is a graph showing the relationship between the number of times of direct overwriting operations (overwriting cycles) on the recording layers and the jitter, illustrated with the heat dissipating layer provided and not provided, and with several variations in the thickness of the heat dissipating layer.

As can be seen from FIG. 4, the heat dissipating layer provided can prevent an increase of the jitter. Since some problems may occur in recording and reproducing operations with a jitter above 15%, it is preferable to set the heat dissipating layer at a thickness greater than or equal to about 40 nm.

Figure 5:
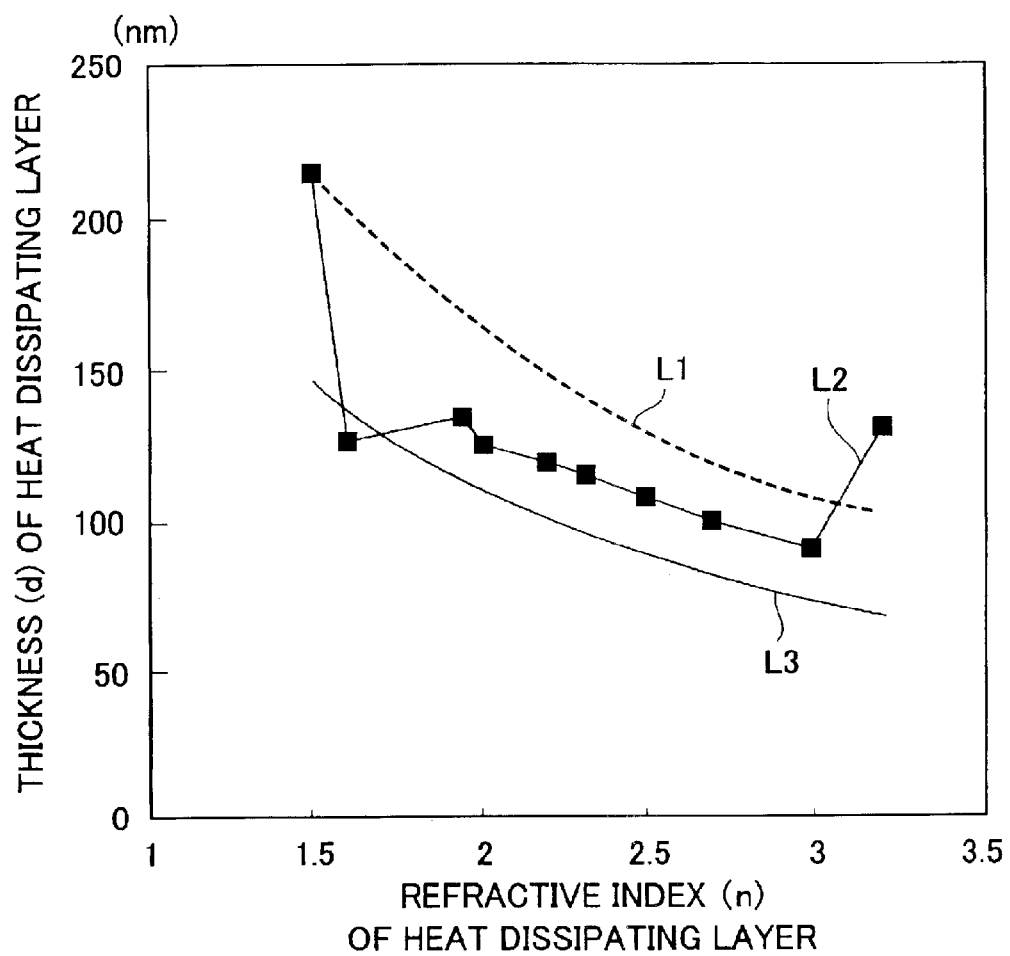
FIG. 5 is a graph showing the relationship between the refractive index and the thickness of a heat dissipating layer.

FIG. 5 is a graph showing the relationship between the refractive index n and the thickness d of the heat dissipating layer 18 under the same condition as that of FIG. 3.

First, referring to FIG. 3, generally the same result was obtained in either cases where the reflective layer 19 was formed of a thin film or bulk of pure silver (Ag), or a AgTi alloy thin film, as shown in FIG. 2. In particular, the transmittance of the reflective layer 19 increases as the refractive index n of the heat dissipating layer 18 exceeds the refractive index $n_{17}$ of the intermediate layer 17 (about 1.6125), saturating at a refractive index n of about 3, and decreasing at a refractive index n greater than about 3.

Accordingly, since the transmittance of the reflective layer 19 depends on the refractive index n of the heat dissipating layer 18, the transmittance of the reflective layer 19 made of metal or an alloy can be increased with the refractive index n of the heat dissipating layer 18 lying within the range of $n_{17} \leq n \leq 3$.

FIG. 5 shows the thickness d of the heat dissipating layer 18 against its refractive index n lying within the range of $n_{17} \leq n \leq 3$ as described above.

In FIG. 5, a characteristic curve L2 of the heat dissipating layer represents the relation between the refractive index n and the thickness d for the reflective layer 19 made of AgTi alloy thin film, while approximation curves L1 and L3 approximate the range of tendency of the changes in the characteristic curve L2.

As can be seen from FIG. 5, with the thickness d set at any value within the range of about 100 to 150 nm, the refractive index n of the heat dissipating layer 18 can be set within the range of $n_{17} \leq n \leq 3$, thereby further increasing the transmittance of the reflective layer 19.

The correlation between the thickness d and the refractive index n is mathematically expressed by the expression (1) described above.

That is, the approximation curve L1 approximating the upper limit of the range of tendency of the changes in the characteristic curve L2 is expressed with $15\lambda/50n + N \times \lambda/2n$, while the approximation curve L3 approximating the lower limit of the range of tendency of the changes is expressed with $2\lambda/50n + N \times \lambda/2n$.

Accordingly, the thickness d and the refractive index n of the heat dissipating layer 18 can be set so as to satisfy any condition within the range defined by these approximation curves L1, L3, thereby increasing the transmittance of the reflective layer 19 and carrying out an appropriate direct overwriting operation without reducing the intensity of the laser beam.

Although the relation between the refractive index n and the thickness d for the heat dissipating layer 18 is shown in FIG. 5 in case of the reflective layer 19 formed of a AgTi alloy thin film, the same property can be obtained by the reflective layer 19 formed of a thin film or bulk of pure silver (Ag).

Thus, the reflective layer 19 can be formed of a thin film or bulk of pure silver (Ag), and the heat dissipating layer 18 may be set the thickness d and the refractive index n so as to satisfy the condition provided by the aforementioned expression (1).

Furthermore, the refractive index n and the thickness d of the heat dissipating layer 18 can be set in accordance with the condition provided by the aforementioned expression (1), while the heat dissipating layer 18 is made of a material having a thermal conductivity higher than that of the reflective layer 19, e.g., a dielectric thin film such as $ZnS-SiO_2$. This makes it possible to prevent the recording layer 21 in the stack "0" from being excessively heated upon direct overwriting. This in turn makes it possible to implement a phase change optical disc which can perform recording and reproducing operations with good quality and provides a large storage capacity.

Figure 6:
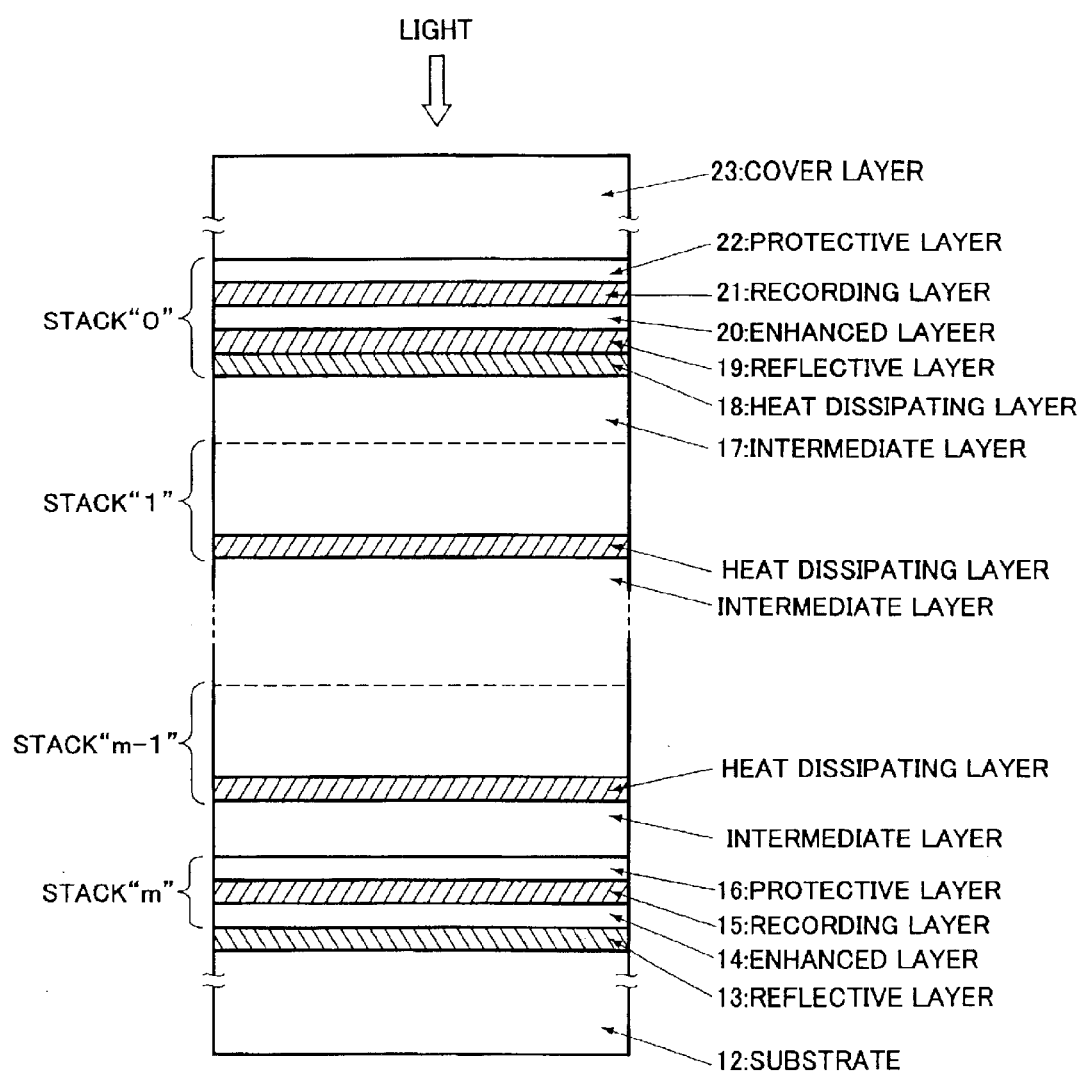
FIG. 6 is a schematic longitudinal sectional view illustrating the structure of a modified example of the embodiment.

The phase change optical disc according to this embodiment shown in FIG. 1 is a so-called two-layer recording optical disc including the two recording layers 15 and 21, but can also be applied to a so-called multi-layer recording phase-change optical disc including more than two recording layers as shown in FIG. 6.

That is, as a modified example, each of m (which is a given integer) stacks, stack "0" to stack "m−1", can be formed in the same manner as is the stack "0" shown in FIG. 1 and the refractive index n and the thickness d of the heat dissipating layer in each of the stack "0" to stack "m−1" are set in accordance with the aforementioned expression (1). This makes it possible to implement a multi-layer recording phase-change optical disc which prevents the recording layer in each of the stack-"0" to stack "m−1" from being excessively heated.

Figure 7:
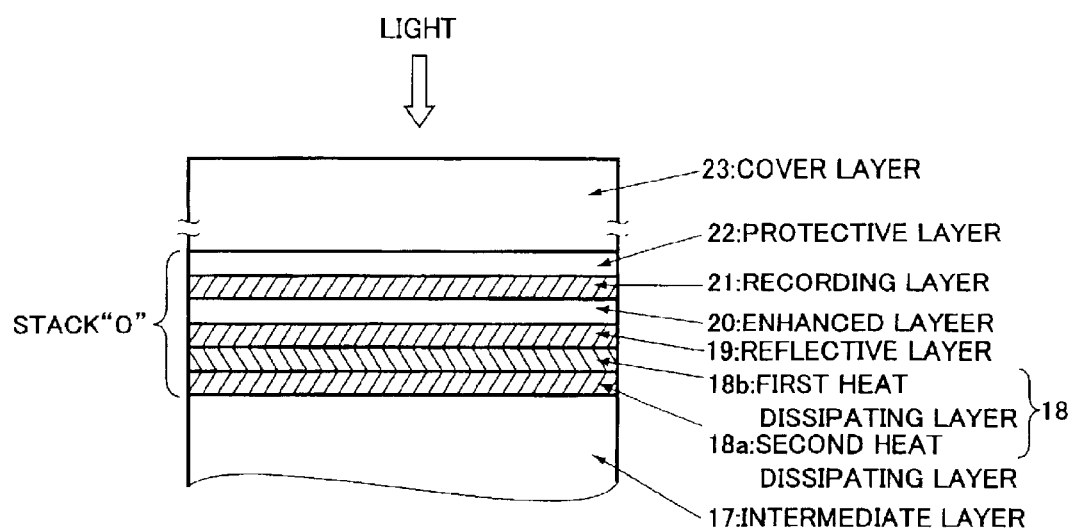
FIG. 7 is a schematic longitudinal sectional view illustrating the structure of another modified example of the embodiment.
Figure 8:
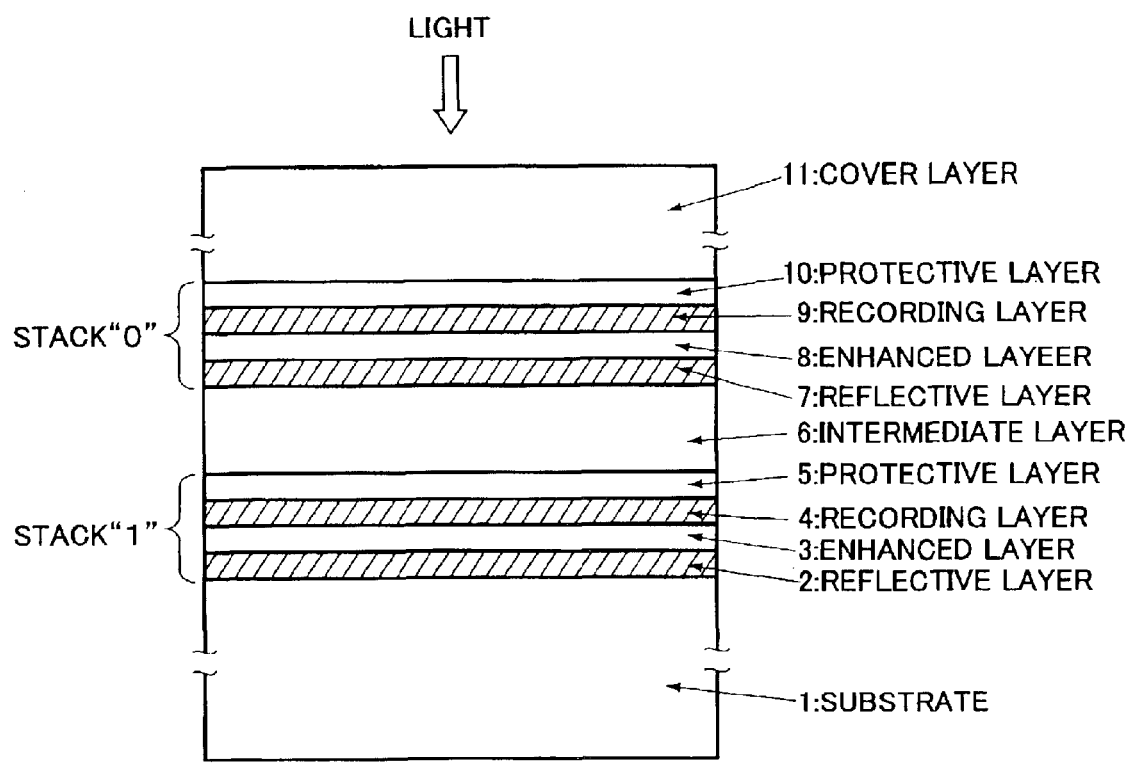
FIG. 8 is a schematic longitudinal sectional view illustrating the structure of a conventional two-layer recording optical disc.

On the other hand, the heat dissipating layer 18 shown in FIG. 1 is formed of one layer, however, as another modified example that one heat dissipating layer can not provide sufficient cooling effect, the heat dissipating layer 18 may also be formed of two or more heat dissipating layers such as a first heat dissipating layer 18a and a second heat dissipating layer 18b as shown in FIG. 7.

Furthermore, the heat dissipating layer of each of the stack "0" to stack "m−1" shown in FIG. 6 may also be formed of two or more heat dissipating layers as shown in FIG. 7.

The material used to form the heat dissipating layer is not limited to the dielectric material described in the aforementioned embodiment, but the heat dissipating layer may be made of any material having a thermal conductivity higher than that of the intermediate layer, for example Sb—Te eutectic material.

As described above, according to the information read/write medium of the present invention, the reflective layer is translucent to a beam of light, while the heat dissipating layer having a predetermined thickness is provided with a thermal conductivity higher than that of the intermediate layer as well as a refractive index higher than or equal to that of the intermediate layer and less than or equal to a refractive index of 3. A recording layer serves to transmit a beam of light to allow information to be recorded on another recording layer or reproduced therefrom. Accordingly, heat generated in a recording layer upon transmitting the beam of light can be absorbed in the heat dissipating layer to prevent the recording layer from being excessively heated, and the light beam can be transmitted by the reflective layer with a higher optical transmittance, thereby allowing the transmitted light beam to be used to properly record information on another recording layer and reproduce it therefrom.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information read/write medium having a plurality of recording layers which enable information to be recorded thereon and reproduced therefrom using a light beam, the medium comprising:

a reflective layer, a heat dissipating layer, and an intermediate layer, the layers being deposited for each of the recording layers for serving to transmit said light beam to allow information to be recorded on and reproduced from another recording layer, wherein said reflective layer is translucent to said light beam, said heat dissipating layer has a thermal conductivity higher than that of said intermediate layer as well as a refractive index higher than or equal to that of said intermediate layer and less than or equal to a refractive index of 3, and said heat dissipating layer has a thickness (d) which satisfies a relation given by the following expression, $$\{(2\lambda/50n)+(N\times\lambda/2n)\}<d<\{(15\lambda/50n)+(N\times\lambda/2n)\}$$

where n is the refractive index of the heat dissipating layer, $\lambda$ is a wavelength of said light beam, and N is a given integer.

2. The information read/write medium according to claim 1, wherein said heat dissipating layer has a thickness greater than or equal to 40 nm.

3. The information read/write medium according to claim 1, wherein said reflective layer is formed of a metal thin film ranging in thickness from 5 to 20 nm.

4. The information read/write medium according to claim 1, wherein said reflective layer is made of Ag or a Ag alloy.

5. The information read/write medium according to any one of claim 1, wherein said heat dissipating layer is made of a dielectric material.

6. The information read/write medium according to claim 1, wherein said heat dissipating layer is made of a Sb—Te eutectic material.

7. An information read/write medium having a plurality of recording layers which enable information to be recorded thereon and reproduced therefrom using a light beam, the medium comprising:

a reflective layer, a plurality of heat dissipating layers, and an intermediate layer, the layers being deposited for each of the recording layers for serving to transmit said light beam to allow information to be recorded on and reproduced from another recording layer, wherein said reflective layer is translucent to said light beam, said respective heat dissipating layers have a thermal conductivity higher than that of said intermediate layer as well as a refractive index higher than or equal to that of said intermediate layer and less than or equal to a refractive index of 3, and said respective heat dissipating layers have a thickness (d) which satisfies a relation given by the following expression, $$\{(2\lambda/50n)+(N\times\lambda/2n)\}<d<\{(15\lambda/50n)+(N\times\lambda/2n)\}$$

where n is the refractive index of the heat dissipating layer, $\lambda$ is a wavelength of said light beam, and N is a given integer.

* * * * *